United States Patent
Pearson

Patent Number: 5,445,807
Date of Patent: Aug. 29, 1995

[54] PRODUCTION OF ALUMINUM COMPOUND

[75] Inventor: Alan Pearson, Murrysville, Pa.

[73] Assignee: Aluminum Company of America, Pittsburgh, Pa.

[21] Appl. No.: 462,409

[22] Filed: Jan. 9, 1990

Related U.S. Application Data

[63] Continuation-in-part of Ser. No. 781,208, Sep. 30, 1985, Pat. No. 5,194,243, which is a continuation of Ser. No. 534,665, Sep. 22, 1983, abandoned.

[51] Int. Cl.$^6$ ............................................. C01F 7/20
[52] U.S. Cl. ................................... 423/625; 423/122
[58] Field of Search ................. 423/625, 122; 501/127

[56] References Cited

U.S. PATENT DOCUMENTS 4,797,139  1/1989  Bauer ................................. 423/628
4,835,124  5/1989  Pearson ............................. 423/626

*Primary Examiner*—Michael Lewis
*Assistant Examiner*—Stuart L. Hendrickson
*Attorney, Agent, or Firm*—Douglas P. Mueller; Daniel A. Sullivan, Jr.

[57] ABSTRACT

A method of manufacture including bringing seed and aluminum hydroxide together in an aqueous medium and hydrothermally digesting for producing boehmite at the expense of the aluminum hydroxide is described. Also disclosed is a process for forming a ceramic body from colloidal boehmite and alpha alumina. Alpha alumina is added to ultimately produce a seeded gel containing microcrystalline boehmite, the seeded gel capable of being sintered at a low temperature to produce a ceramic product. The colloidal boehmite may be purified by ion exchange to remove alkali metal ions.

12 Claims, 7 Drawing Sheets

SEEDED SOL-GEL EXPERIMENTAL PROCEDURE

⊢——⊣ = 0.1 MICRONS

⊢——⊣ = 0.1 MICRONS

⊢——⊣ = 0.1 MICRONS

SEEDED SOL-GEL EXPERIMENTAL PROCEDURE

NO SEED

1% SEED

10% SEED

NO SEED

1 Hr. AT 1350° C

ION EXCHANGE TYPE B GEL WITH CLASSIFIED XA-139 SEED

1% SEED

1 Hr. AT 1350° C

ION EXCHANGE TYPE B GEL WITH CLASSIFIED XA-139 SEED

10% SEED

1 Hr. AT 1350° C

ION EXCHANGE TYPE B GEL WITH CLASSIFIED XA-139 SEED

PRODUCTION OF ALUMINUM COMPOUND

CROSS-REFERENCES TO RELATED APPLICATIONS

This is a continuation-in-part of Ser. No. 781,208, filed Sep. 30, 1985, now U.S. Pat. No. 5,194,243, which is a continuation of Ser. No. 534,665, filed Sep. 22, 1983, now abandoned. This application is related to Ser. No. 946,839, filed Dec. 29, 1986, now U.S. Pat. No. 4,835,124.

FIELD OF THE INVENTION

The present invention relates to the preparation of a compound of aluminum containing oxygen and hydroxide and the production of a ceramic body therefrom. More particularly, the present invention relates to a method of forming an alumina-containing ceramic body of high density and fine grain structure.

BACKGROUND OF THE INVENTION

Colloidal, e.g. 35 to 250 m$^2$/g, boehmite (also referred to as pseudoboehmite, alumina monohydrate and aluminum oxide hydroxide), especially in a form capable of forming stable aqueous dispersions, is a very useful material. Such boehmite has been produced commercially, e.g. as a by-product of the Ziegler process for making primary alcohols. This is an alkoxide-based approach. A number of applications have been developed for this type of product, including frictionizing agent for paper bags and boxes, antistatic agent for carpets and textiles, binder for catalysts and special ceramics, and thixotropic agent and viscosity control for various suspensions.

Sol-gel processing of alumina ceramics has received much interest in the last several years as a potential method of producing sintered alumina with properties superior to those of traditional alumina ceramics. The hope has been that uniform distribution of controlled additives along with very small, uniform porosity (which is characteristic of sol-gel material) would permit densification at ultra-low temperatures and result in alumina ceramics with greatly improved properties.

One major problem has been that the alumina sols are prepared from microcrystalline boehmite, and that in transforming from boehmite to gamma to alpha alumina, a porous structure with very poor sintering characteristics results. One approach to solving this problem is disclosed in U.S. Pat. No. 4,314,827. The patent discloses using a second component (5–6% MgO) which apparently modifies the calcination and sintering characteristics and allows a very fine grained, tough microstructure to be achieved.

In the prior art, other attempts have been made to develop high density alumina ceramic parts. For example, an article entitled "Enhanced Densification of Boehmite Sol-Gels by Alpha-Alumina Seeding" by Kumagai and Messing (November 1984) discloses seeding boehmite sol-gels with alpha alumina and subsequently sintering to obtain high densities at 1200° C., whereas unseeded gel had to be sintered at 1600° C. In this work, the boehmite powder was formed by hydrolysis of aluminum alkoxide.

European patent application No. 152,768 discloses that the hardness and microstructure of aluminous abrasives produced from alumina gels are enhanced by the introduction of very fine alpha alumina seed particles in the amount of 1% or less.

The prior art processes require rather expensive processing to obtain the sol-gel precursor for the sintered grain. Therefore, there is a great need for an inexpensive process which can result in a high quality sintered product. The subject invention provides such a process which will permit the use of sintered alumina based on sol-gel processing to have wide application.

SUMMARY OF THE INVENTION

It is an object of the present invention to provide a method for preparing a compound of aluminum containing oxygen and hydroxide.

It is another object of the present invention to provide a method for preparing a high-quality sintered alumina from an inexpensive precursor.

These objects, as well as other objects which will become apparent in the discussion that follows, are achieved, according to the present invention, by providing a method of manufacture including the steps of bringing seed and aluminum hydroxide together in an aqueous medium and hydrothermally digesting for producing boehmite at the expense of the aluminum hydroxide. In accordance with the objects of the invention, there is provided a process for forming a ceramic body from colloidal boehmite and alpha alumina comprising the steps of forming the colloidal boehmite by bringing the aluminum hydroxide selected from the group consisting of gibbsite, bayerite and nordstrandite together in a liquid aqueous medium with a seed effective for providing a base for boehmite growth, and reacting under hydrothermal conditions for producing colloidal boehmite by depositing boehmite on the seed at the expense of the aluminum hydroxide. In addition, alpha alumina is added to produce a seeded gel, the seeded gel capable of being sintered at a low temperature to produce a ceramic product having at least a 90% theoretical density and fired grain size below 1.0 micrometer diameter.

DESCRIPTION OF PREFERRED EMBODIMENTS

Figure 1:
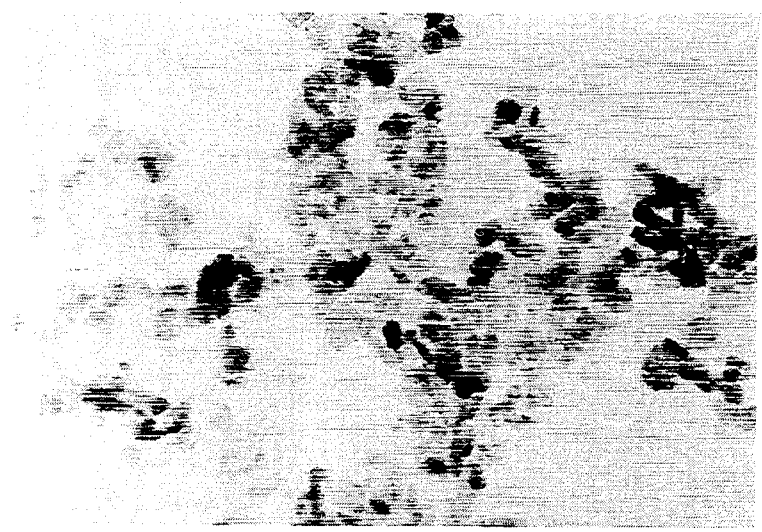
FIGS. 1 to 3 are transmission electron photomicrographs of the colloidal boehmite products resulting from differing relative amounts of aluminum hydroxide in the feed mixture.

The invention involves an improved process for manufacture of colloidal alumina by hydrothermal digestion of a mixture of aluminum hydroxide and a high surface area alumina seed. Aluminum hydroxide is also called "alumina trihydrate" and "gibbsite". Aluminum hydroxide can also have crystal structures other than that of gibbsite. Examples are bayerite or nordstrandite.

According to the invention, a highly dispersible, inexpensive colloidal boehmite can be produced by the following process: (a) prepare a high, e.g. greater than about 100 $m^2/g$, where $m^2/g$ stands for square meters per gram, surface area, well dispersed, e.g. median particle size less than about 500 Angstroms, alumina seed consisting essentially of amorphous or microcrystalline boehmite phases; (b) mix this seed material plus water with a less expensive alumina product such as gibbsite to form an aqueous slurry; (c) convert the mixture to a colloidal boehmite by hydrothermally digesting the mixture.

Using the process of the invention, one can prepare dispersible alumina with the high surface area component amounting to as little as 5% of the feed and the less expensive gibbsite amounting to 95%. Apparently, during the hydrothermal digest, the high surface area component is quickly converted to colloidal boehmite while the gibbsire component slowly converts to boehmite through a dissolution-seeding mechanism. The process of the invention can occur in the pH range of 2 to 11, preferably 4 to 10, which is surprising, because alumina has very little solubility in this range. From these ranges it will be apparent that the present invention can be practiced with either an acidic or a basic digest. An advantage of the acid digest is that for a given % aluminum hydroxide content and seed surface area, the acidic digest gives the greater surface area in the boehmite product.

Advantages of the invention include that a substantial amount of the alumina is furnished by a low cost material and no washing or filtration of the product is required after conversion to boehmite. Lack of need for filtration is especially important because colloidal boehmite is quite difficult to filter and wash. In the alkoxide-based approach of e.g. U.S. Pat. No. 3,357,791, little or no washing is required but the starting material is quite expensive.

Other methods of producing this type of material have also been proposed and each has disadvantages compared to the process of this invention. Colloidal boehmite can be prepared by hydrothermal treatment of amorphous alumina gels or aluminum salt solutions (e.g. U.S. Pat. Nos. 2,763,620 and 2,915,475), but raw materials tend to be expensive, and washing is required after conversion to boehmite to remove the associated salts. Another approach involves hydrothermal digestion of very fine gibbsire in a specific mixture of salts (U.S. Pat. No. 3,385,664), but, again, the starting materials are expensive and washing is required. In still another approach, activated alumina is hydrothermally digested with water (U.S. Pat. No. 4,117,105). This process avoids the need for washing, but yields are low unless very fine gibbsite is used, and consequently raw material costs are high. Yields can be improved by digesting activated alumina in the presence of acid (U.S. Pat. No. 4,344,928), but high yields require a large amount of acid which becomes expensive and must be washed out. Although some of these expenses still apply to the high surface area seed component of our process, the overall cost is diluted by addition of the low-cost aluminum hydroxide component.

The high surface area component provides a colloidal seed and can be prepared in any manner that results in a high surface area amorphous alumina or boehmite. Minor contamination of this seed with other phases such as bayerite of gibbsire can be tolerated since they will convert to boehmite during the hydrothermal digest. It is even conceivable to use a seed of a material other than alumina, for example a material having a crystal structure approximating that of boehmite, where the contamination does not matter in the end use of the product. Examples of processes that can be used to provide high surface area seed are hydrolysis of aluminum alkoxides and the many well-known alumina gel reactions. Regardless of which approach is taken, the seed must have high surface area and be capable of attaining a well-dispersed condition. For a desired surface area in the product boehmite, the higher the surface area of the seed, the greater is the permissible proportion of aluminum hydroxide in the seed-aluminum hydroxide mixture; there is some trade-off here in that, while the greater proportion of aluminum hydroxide is a savings, higher surface area seed is more expensive. Impurities such as organics or inorganic salts formed in the seed preparation process should be removed before digestion since filtration and washing of the material after digestion are very difficult. Degree of seed washing required will depend on the purity desired in the final product.

While recognizing that seed surface area and particle size are factors affecting the process, it is well to note that it is preferred to accept the seed manufacturer's information on surface area and particle size at face value and to control the process on the basis of the surface area resulting in the boehmite end product. If the seed is being made on-site, seed producing processes such as detailed in the Examples below can be run without there being any measurements made of the seed surface area or particle size, and the adequacy of the seed checked by measurement of the surface area in the boehmite end product. In this sense, it can be said that seed surface area and particle size for the invention are those effective for producing boehmite of surface area in the range 35–250 $m^2/g$.

The low cost aluminum hydroxide component can be gibbsire or bayerite. It is desirable to use a fine particle size aluminum hydroxide (nominally 5 micron crystal size or less), since coarser particles will require more severe digestion conditions (higher temperature, longer time) to completely react and lead to a somewhat lower surface area product. The fine particle size can be attained either by precipitation or grinding.

If dispersing agents are used to peptize the system, they should be effective but not interfere with the end use. For example, chlorides and sulfates are generally undesirable in catalytic applications. Nitric acid is preferred since it is a very effective peptizing agent in the pH range of about 5 or less and is generally not objectionable in the product.

The hydrothermal digestion of the invention is carried out in a closed pressure vessel preferably without supplemental pressure regulation by nitrogen introduction or the like, i.e. reading the pressure essentially permits knowledge of temperature by way of the pressure-temperature relationship for steam in equilibrium with water. Preferred batch digest conditions are about 180 to 220° C. for about one hour. Percent solids (seed plus hydroxide) can be from e.g. 2 to 40%, preferably 4½ to 20%.

Further illustrative to the principles of the invention are the following examples, the parameters and results of which are tabularly presented in Table 1 (S.A. stands for surface area, H-710 for Hydral 710 gibbsite of Aluminum Company of America). The boehmite products of these examples yield X-ray diffraction patterns matching those of cards 5-0190 and 21-1307 of the Joint Committee on Powder Diffraction Standards, Swarthmore, Pa.

EXAMPLE 1—COMPARATIVE

This example shows the properties of boehmite made by digesting a fine crystalline gibbsite without seed addition, in order to establish baseline properties for comparison to the present invention. A commercial, precipitated aluminum hydroxide in the form of gibbsite (Hydral 710 gibbsite) having BET surface area of 6 $m^2/g$ and size distribution as shown by curve "710" in FIG. 4 was selected as the test material. It is nominally one-micron material as determined by the abscissa for the point having an ordinate of 50% on its size distribution curve. This material was digested as a 10% ($Al_2O_3$ basis) suspension in water for 1 hour at 200° C. The resulting boehmite product had a surface area of 9.9 $m^2/g$.

EXAMPLE 2—COMPARATIVE

The experiment of Example 1 was repeated but 2.0 g $HNO_3$/100 g $Al_2O_3$ were added before digestion. The resulting product was significantly finer with a surface area of 19.9 $m^2/g$.

Examples for preparing the alumina compound in accordance with the invention:

EXAMPLE 3

This example shows the effect of seeding during digestion with a sulfate-derived alumina gel. It additionally illustrates an approach to the invention lacking addition of an acidic peptizing agent before digestion.

The alumina monohydrate, i.e. boehmite, was made by digestion of a 50-50 mixture ($Al_2O_3$ basis) of gelatinous alumina seed and 1-micron size alumina trihydrate (Hydral 710 gibbsite).

The alumina gel seed was prepared by rapidly adding a solution of sodium aluminate to a dilute solution of aluminum sulfate at 50° C. in such proportion that the pH of the finished mix is approximately 10. After 1 hour of agitation the gel was filtered and washed.

The gel cake which contained about 5% $Al_2O_3$ (95% $H_2O$) was mixed with the Hydral gibbsite and water added to give a slurry containing 4.3% $Al_2O_3$. The slurry was placed in a nickel-plated steel pressure vessel and digested at 200° C. for 1½ hours. The vessel was cooled and the product slurry removed. The slurry after digestion had a lower viscosity than before the digest. It also had lower opacity. Its pH was 10.25 (the pH before the digest was 9.8). This is thus an example of a basic digest. The slurry was filtered and washed. The filter cake was gel-like. It contained 16% $Al_2O_3$. To the filter cake was added glacial acetic acid, in an amount equal to about 3% of the $Al_2O_3$ content. This caused peptization and liquefaction of the filter cake, yielding a translucent sol. The resulting sol was then placed in an oven to dry at 105° C.

The product shrank to a firm, hard, porcelain-like mass during drying. However, it was not difficult to grind it to a powder. When this powder was mixed with water, it quickly dispersed and regained the appearance that it had before drying. Its pH was 4.3, due to addition of acetic acid. This dispersion, when applied to a glass surface, dried to an adherent, nearly transparent film.

The chemical analysis of the product was:

| | |
|---|---|
| Ignition loss | 21.27% |
| $SO_3$ | .12% |
| $Na_2O$ | .03% |
| Acetic Acid | 1.90% |
| $Al_2O_3$ (calculated) | 78.7% |

X-ray diffraction analysis showed only boehmite and BET surface was 159 $m^2/g$.

EXAMPLES 4a and 4b

These examples show the effect of seeding with a gel derived by a different approach. To prepare the gel, sodium aluminate liquor was rapidly neutralized by gassing with $CO_2$ and washed to remove residual sodium carbonate. The resulting "gel" was a mixture of amorphous alumina and microcrystalline boehmite. Portions of this gel were slurried with water and Hydral 710 gibbsite in such a way that the final mixture contained 5% solids ($Al_2O_3$ basis). In one case (Example 4a), equal amounts of Hydral and gel were used ($Al_2O_3$ basis) and in the other case (Example 4b) a mixture of 75% Hydral/25% gel was used. After digesting for 1 hour at 190° C., the products were microcrystalline boehmites having surface areas of 164 and 91 $m^2/g$, respectively.

EXAMPLES 5a to 5d

These examples show the additional improvement in properties which can be achieved by seeded digestion in the presence of a peptizing agent. The experiments of Examples 4a and 4b were repeated except in each case the mixture pH was adjusted to 4.0 with $HNO_3$ before digestion. This is thus an example of an acid digestion. Tests were also included in which the Hydral 710 gibbsite content was increased to 85 and 95%. Surface area data are shown in the Table and for a given gel content are significantly higher than in Examples 4a and 4b. This shows that while a peptizing agent is not necessary in the seeded digestion process, its use will produce higher surface area products and/or allow a reduction in the seed amount.

Figure 2:
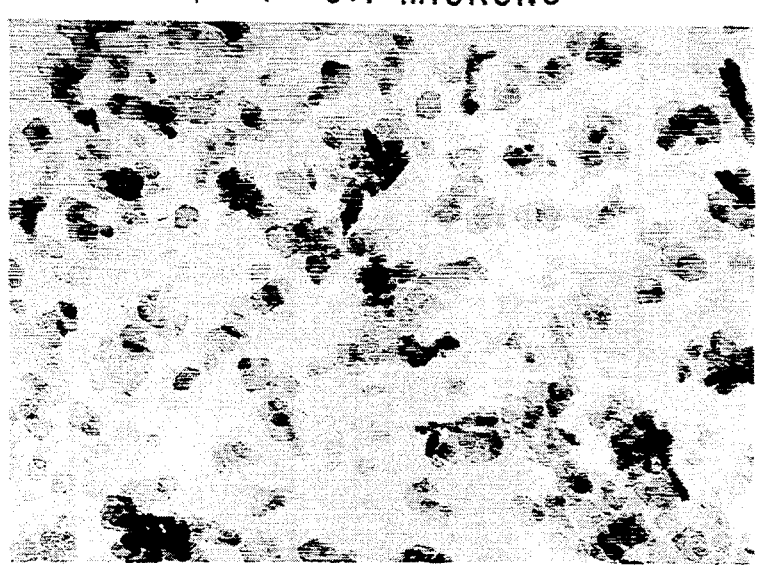
Figure 3:
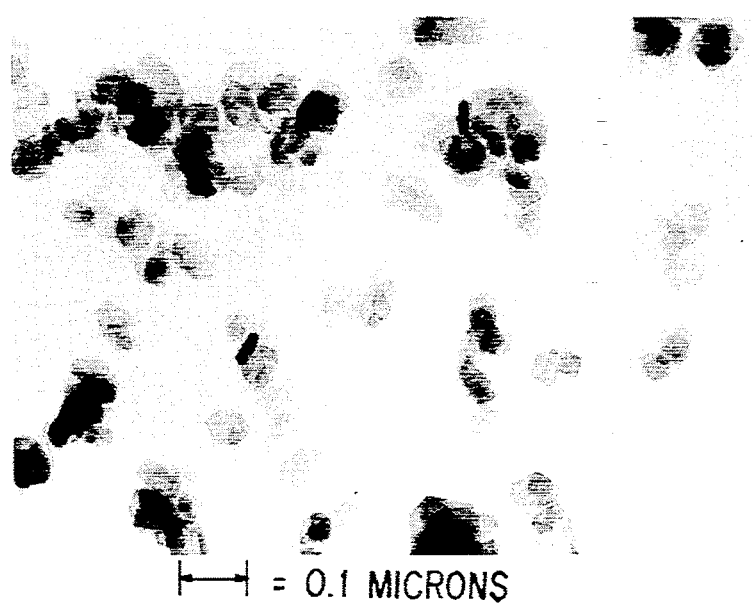

Transmission electron micrographs of digested products representing 75, 85 and 95% Hydral feed are shown in FIGS. 1 to 3, respectively. These pictures show that seeded digestion results in quite uniform boehmite crystallites which can be orders of magnitude smaller than the gibbsite feed component.

EXAMPLE 6

This example demonstrates that the gibbsite source is not limited to Hydral 710 gibbsite. A precipitated gibbsite having a median (ordinate of 50 cumulative mass percent) particle size of 3.9 $\mu$m (Product A in FIG. 4) was mixed with the type of gel described in Examples 4a and b so that a 20% solids aqueous suspension ($Al_2O_3$ basis) resulted, with 25% of the alumina furnished by the gel and 75% furnished by the gibbsite. The pH of the suspension was adjusted to 4.0 with HNO₃ before digestion. After digestion for one hour at 190° C., the resulting product was microcrystalline boehmite having a surface area of 152 m²/g, the same as the product of Example 5b.

EXAMPLES 7a to 7e

These examples show the effect of varying digestion temperature on product properties. The experiment of Example 5b was repeated but at 20% solids and at digest temperatures (1 hour hold) ranging from 155° to 225° C. In each test, pH of the slurry was adjusted to 4.0 with HNO₃ before digestion. After digestion, portions of the slurries were spread on glass and allowed to dry. The quality of the resulting film was observed visually as an indication of colloidal properties. A transparent, glassy film indicates very fine porosity, meaning fine particles in a well-dispersed state. As particle size increases, the film takes on an opaque or porcelain appearance, and as the particles approach micron size, the dry residue becomes a chalky powder rather than a tough film. The results of this series are shown below:

| Sample | Digest Temp. (°C.) | Product Properties | | XRD* Analysis |
| --- | --- | --- | --- | --- |
| | | Surface Area (m²/g) | Dry Film Appearance | |
| 7A | 155 | — | Opaque, cracked | Major Gibbsite Major Boehmite |
| 7B | 175 | — | Glassy, cracked | Minor Gibbsite Major Boehmite |
| 7C | 190 | 150 | Glassy | Boehmite |
| 7D | 200 | 132 | Glassy | Boehmite |
| 7E | 225 | 98 | Porcelain | Boehmite |

*X-ray diffraction analysis

These data show that, for good conversion of gibbsite to colloidal boehmite, some minimum digest conditions must be achieved. One hour at 155° C. was insufficient since the product contained a major amount of gibbsite. One hour at 175° C. was almost sufficient, but a minor amount of gibbsite still remained. It should be recognized that more complete conversion can be accomplished by longer holding times at these lower temperatures. Conversely, holdings times shorter than one hour can be matched with high temperatures to obtain the desired amount of conversion. It should also be recognized that unreacted gibbsite can be separated from the product slurry by known techniques such as filtration, sedimentation, centrifugation, etc. Also, in some applications, some residual gibbsite in the product may be acceptable.

As digest temperature was increased above 175° C., full conversion was achieved. At 225° C., surface area was significantly reduced and the film had taken on a porcelain appearance.

EXAMPLES 8a and 8b

These examples show that ground gibbsite can be used in the process of this invention as well as the precipitated products described above. Bayer process gibbsite was mechanically ground to a 3.5 μm median particle size indicated by curve B in FIG. 4. The experiment of Example 7d was repeated, except hydrate B of FIG. 4 was substituted for Hydral 710 gibbsite. The resulting product had a surface area of 125 m²/g and produced a glassy film.

The same experiment was repeated, but a coarser ground Bayer process hydrate (7 μm median, curve C in FIG. 4) was substituted as the gibbsite component. After digestion, the product had a surface area of 106 m²/g and produced a cracked, porcelain-appearing film. Also, the digested slurry contained a significant amount of coarse material which settled on standing. As indicated by the particle size distribution curve of FIG. 4, the feed hydrate contained some rather coarse particles with 40% above 10 μm and 15% above 20 μm. Under the digest conditions used, these coarser particles were not completely converted to colloidal boehmite. This coarser hydrate could be used as a feedstock for microcrystalline boehmite production, but an auxiliary processing step to remove coarse material before or after digestion would probably be needed.

EXAMPLES 9a to 9c

These examples demonstrate that other types of seed can be used in the process of this invention. A commercial colloidal boehmite (Catapal® SB, Product of Conoco) derived from hydrolysis of alkoxides was used as the seed component in these tests. As a baseline experiment, a 10% solids slurry of Catapal SB was adjusted to pH 4.0 with HNO₃ and digested 1 hour at 200° C. This treatment is similar to that described in U.S. Pat. No. 4,360,449. The product had a surface area of 152 m²/g. The test was repeated, but Hydral 710 was added so that equal amounts (Al₂O₃ basis) of Catapal SB boehmite and Hydral 710 gibbsite were present in the feed. The resulting product had a surface area of 151 m²/g. The experiment was again repeated, but this time ground hydrate B (FIG. 4) was the gibbsite source. After digestion, the product surface area was 159 m²/g.

TABLE 1

| Example | Seed | | Aluminum Hydroxide | | Digest Conditions | | | | Product S.A. |
| --- | --- | --- | --- | --- | --- | --- | --- | --- | --- |
| | Source | % | Source | % | Time (hr.) | Temp. (°C.) | % Solids | HNO₃ | |
| 1 | — | 0 | H-710 | 100 | 1 | 200 | 10 | no | 9.9 |
| 2 | — | 0 | H-710 | 100 | 1 | 200 | 10 | yes | 19.9 |
| 3 | Sulfate gel | 50 | H-710 | 50 | 1.5 | 200 | 4.3 | no | 159 |
| 4a | CO₂ gel | 50 | H-710 | 50 | 1 | 190 | 5 | no | 164 |
| 4b | CO₂ gel | 25 | H-710 | 75 | 1 | 190 | 5 | no | 91 |
| 5a | CO₂ gel | 50 | H-710 | 50 | 1 | 190 | 5 | yes | 223 |
| 5b | CO₂ gel | 25 | H-710 | 75 | 1 | 190 | 5 | yes | 152 |
| 5c | CO₂ gel | 15 | H-710 | 85 | 1 | 190 | 5 | yes | 140 |
| 5d | CO₂ gel | 5 | H-710 | 95 | 1 | 190 | 5 | yes | 114 |
| 6 | CO₂ gel | 25 | A* | 75 | 1 | 190 | 20 | yes | 152 |
| 7d | CO₂ gel | 25 | H-710 | 75 | 1 | 200 | 20 | yes | 132 |
| 7e | CO₂ gel | 25 | H-710 | 75 | 1 | 225 | 20 | yes | 98 |
| 8a | CO₂ gel | 25 | B* | 75 | 1 | 200 | 20 | yes | 125 |
| 8b | CO₂ gel | 25 | C* | 75 | 1 | 200 | 20 | yes | 106 |
| 9a | Catapal® SB | 100 | — | — | 1 | 200 | 10 | yes | 152 |

TABLE 1-continued

Summary of Examples and Results

| Example | Seed Source | % | Aluminum Hydroxide Source | % | Digest Conditions Time (hr.) | Temp. (°C.) | % Solids | $HNO_3$ | Product S.A. |
| --- | --- | --- | --- | --- | --- | --- | --- | --- | --- |
| 9b | Catapal ® SB | 50 | H-710 | 50 | 1 | 200 | 10 | yes | 151 |
| 9c | Catapal ® SB | 50 | B* | 50 | 1 | 200 | 10 | yes | 159 |

Figure 4:
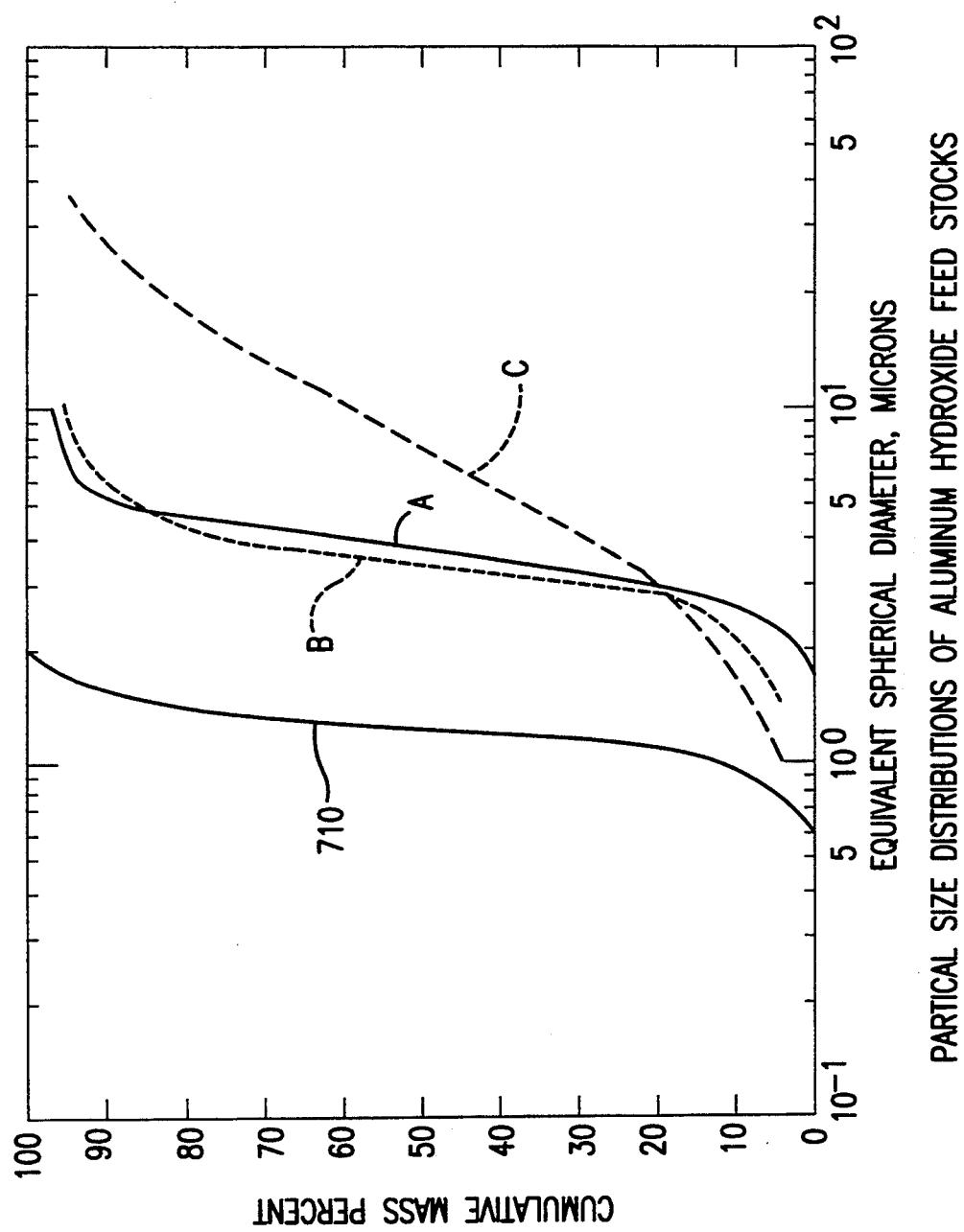
FIG. 4 shows particle size distribution of the aluminum hydroxides used in the examples; "cumulative" signifies that, for a given point on a size distribution curve, the ordinate is the mass percent of material having particle sizes less than the corresponding abscissa.

*Curves in FIG. 4:
A = 3.8 microns average particle size, precipitated
B = 3.5 microns average particle size, ground
C = 7.0 microns average particle size, ground Unless indicated otherwise, percentages herein are weight-percents.

The discussion will now describe preferred embodiments for preparing ceramic bodies in accordance with the invention.

A preferred process for forming a ceramic body from colloidal boehmite and alpha alumina in accordance with the invention includes the following steps: (a) forming the colloidal boehmite by (i) bringing aluminum hydroxide (i.e., gibbsite, bayerite or nordstrandite) together in a liquid aqueous medium with a seed effective for providing a base for boehmite growth, and (ii) hydrothermally digesting for producing colloidal boehmite by depositing boehmite on the seed at the expense of aluminum hydroxide; and (b) adding alpha alumina to produce a seeded gel, the gel capable of being dried and then sintered at a low temperature to produce a ceramic product having at least a 90% theoretical density. The alpha alumina may be added as a water slurry, before and/or after digestion, preferably having a pH in the range of 2 to 5. Preferably, the alpha alumina is added after digestion to the colloidal boehmite. The median size of the alpha alumina can be as low as 0.01 micrometers. Preferably, the alpha alumina has a median particle size in the range of 0.05 to 2 micrometers. A gelling agent may be added to produce the seeded gel. Additionally, the gel may be dried for a sufficient time to remove nitrates.

Figure 5:
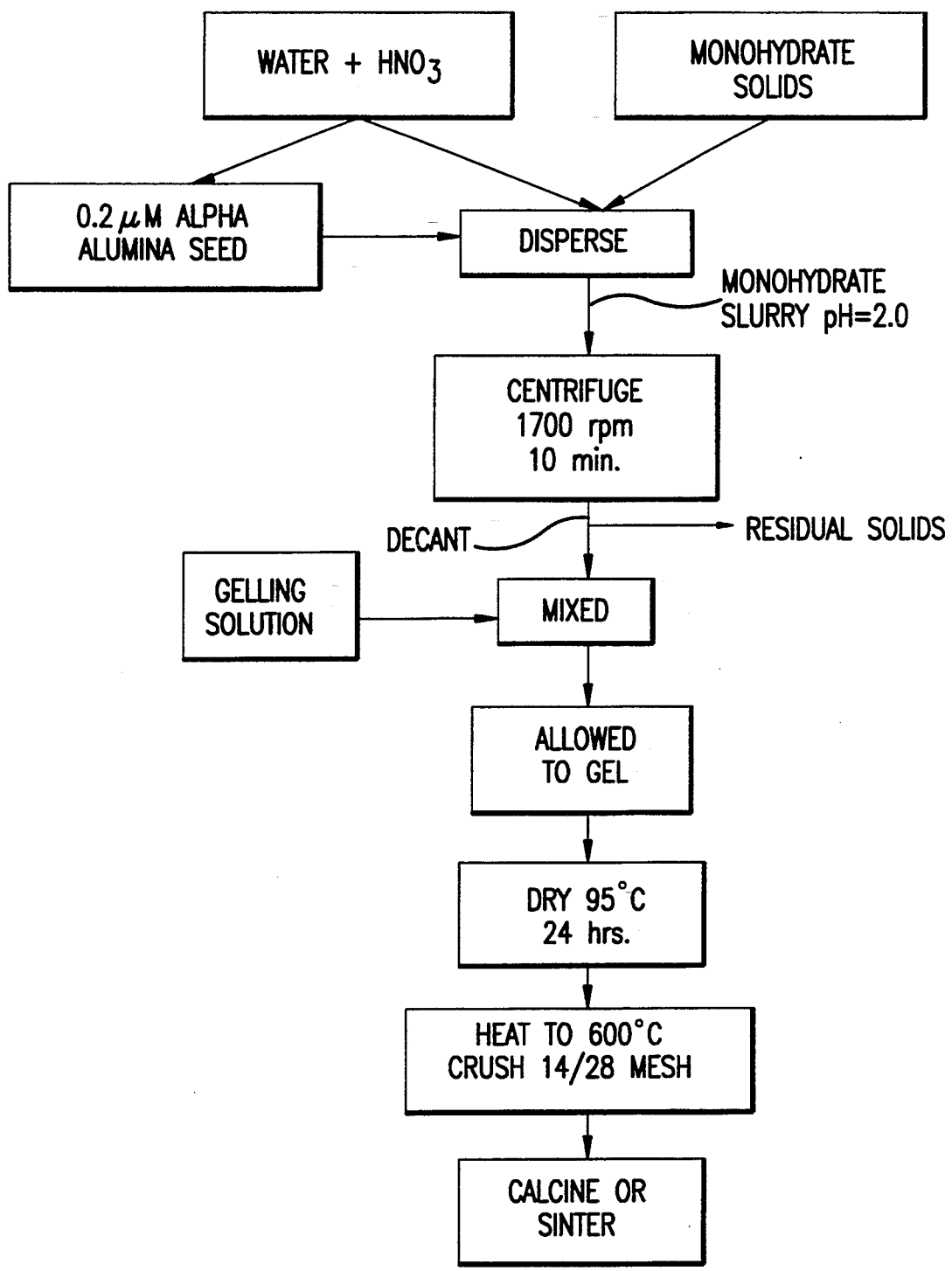
FIG. 5 is a flow diagram of the process for preparing ceramic bodies in accordance with the invention.

Referring now to FIG. 5, there is shown a block diagram of a process for preparing ceramic bodies in accordance with the invention. The monohydrate solids or boehmite used in the invention can be in dry powder or slurry form. In accordance with the process the powder is mixed with water and the pH adjusted to 2 to 4 with $HNO_3$ before being mixed or dispersed for about 2 minutes in a blender.

For purposes of seeding alpha alumina particles may be added after mixing or dispersing to provide a boehmite slurry. The seeding material which preferably is added as a slurry can be prepared by dispersing alpha alumina (e.g. Alcoa XA-139 SG alumina) in water e.g. 50 gms of powder to 150 gms of water and the pH adjusted 3.0 with $HNO_3$. Preferably the alpha alumina has a median particle size in the range of 0.05 to 1.0 micrometer with typical median particle size being about 0.2 micrometers. Smaller submicron particle sizes are preferred since more seed particles are available as shown by the relationship, n approximately equal to $K/D^3$, where n is the number of particles K is a proportionality constant and D is the particle diameter. To obtain the smaller sizes standard classification methods such as sedimentation or centrifugation can be used if desired. The effect of seed particle size in seeding of alkoxide-derived alumina is discussed in the Kumagai and Messing article.

In the procedure the slurries (seeded sols) are normally centrifuged and then gelled by evaporation or the addition of gelling agents. Any suitable gelling agent may be used e.g., a 15% $Mg(NO_3)_2$ solution to provide a 0.5% MgO ($Al_2O_3$ basis) or a 21% $Al(NO_3)_3$ solution to provide 1% $Al_2O_3$. The slurry may be mixed to permit the gelling agents to become more uniformly distributed before or after being allowed to gel.

The gels may be oven dried, e.g. overnight at 90° C., and then heated for a sufficient time to remove nitrates. Typically, the nitrates can be removed by treating for one hour at 600° C. After nitrate removal, the material is calcined or sintered to produce a highly dense, alumina ceramic product having a fine grained uniform microstructure.

Colloidal alumina required for this invention is produced by hydrothermal digestion of a mixture of aluminum hydroxide and a high surface area alumina gel or microcrystalline boehmite seed. Aluminum hydroxide is also called "alumina trihydrate" and "gibbsite". Aluminum hydroxide can also have crystal structures other than that of gibbsite. Examples are bayerite or nordstrandite.

According to this aspect of the invention, a highly dispersible, inexpensive colloidal boehmite can be produced by the following process: (a) prepare a high, e.g. greater than about 100 $m^2/g$, where $m^2/g$ stands for square meters per gram, surface area, well dispersed, e.g. median particle size less than about 500 Angstroms (i.e., less than about 0.05 microns), alumina seed consisting essentially of amorphous or microcrystalline boehmite phases; (b) mix this seed material plus water with a less expensive alumina product such as gibbsite to form an aqueous slurry; (c) convert the mixture to colloidal boehmite by heating at high temperature under autogenous steam pressure, i.e. in an autoclave.

Using this process, one can prepare dispersible alumina with the high surface area component amounting to as little as 5% or less of the total alumina equivalent in the feed and the less expensive gibbsite amounting to 95%. Apparently, during high temperature reaction, the high surface area component is quickly converted to colloidal boehmite while the gibbsite component slowly converts to boehmite through a dissolution-seeding mechanism.

Advantages of the invention include that a substantial amount of the alumina is furnished by a low cost material and no washing or filtration of the product is required after conversion to boehmite. Lack of need for filtration is especially important because colloidal boehmite is quite difficult to filter and wash. In the alkoxide-based approach of e.g. U.S. Pat. No. 3,357,791, little or no washing is required but the starting material is quite expensive.

The main impurity in the product is sodium oxide at a level of 0.15 to 0.3%. This is present in the low-cost gibbsite feedstock and carries through to the product. If a lower sodium content is required in certain cases, the sodium can be further reduced by using gibbsite with a lower soda content or removing the sodium after the boehmite is formed by ion exchange, dialysis or other means.

Examples of processes that can be used to provide high surface area seed are hydrolysis of aluminum alkoxides and the many well-known alumina gel reactions. Regardless of which approach is taken, the seed must have high surface area and be capable of attaining a colloidally-dispersed condition.

The low cost aluminum hydroxide component can be gibbsite or bayerite. It is desirable to use a fine particle size aluminum hydroxide (nominally 5 micron crystal size or less) since coarser particles will require more severe digestion conditions (higher temperature, longer time) to completely react and lead to a somewhat lower surface area product. The fine particle size can be attained either by precipitation or grinding.

If dispersing agents are used to peptize the system, they should be effective but not interfere with the end use. For example, chlorides and sulfates are generally undesirable in catalytic applications. Nitric acid is preferred since it is a very effective peptizing agent in the pH range of about 5 or less and is generally not objectionable in the product.

The hydrothermal reaction of the invention is carried out in a closed pressure vessel preferably without supplemental pressure regulation by nitrogen introduction or the like, i.e. reading the pressure essentially permits knowledge of temperature by way of the pressure-temperature relationship for steam in equilibrium with water. Preferred batch reaction conditions are about 180° to 220° C. for about one hour. Percent solids (seed plus hydroxide) can be from e.g. 2 to 40%, preferably $4\frac{1}{2}$ to 25%.

Unless indicated otherwise, percentages herein are weight-percents.

To further illustrate the invention, two types of hydrothermally produced dispersible alumina, denoted A and B, were used in accordance with the invention. Properties of these materials are shown in Table 2. The Type A material had a surface area of about 100 m$^2$/g and Type B material had a surface area of about 120 m$^2$/g. Data in Table 2 show analyses of these materials both before and after ion exchange.

Solids concentrations of the mixes were prepared with Type A being 25% and Type B being 23%. These slurries were centrifuged at 1700 rpm for 10 minutes then gelled by adding the solutions indicated above. The gels (consistency of thin paste) were then mixed in a Hobart paddle mixer for 10 minutes to allow some extra time for the gelling agents to become uniformly distributed.

Type B material was used as a 20% solids slurry. In an attempt to lower the sodium content of this material, 1000 g of slurry was stirred with 200 cc of Dowex HCR-W2-H strong acid ion exchange resin for 4 hours at room temperature. During this time, the pH of the slurry fell from about 3.6 to 2.5 indicating that sodium was being removed. At the end of this time, the resin was screened out, the slurry pH was adjusted to 2.0 and then mixed, centrifuged and gelled as indicated above. Type B was used with and without the ion exchange treatment to determine the effect of sodium on this process.

The seed used was a fine particle size fraction of Alcoa XA-139 alumina. Fifty grams of the seed alumina was mixed in 150 grams of water and the pH was adjusted to 3.0 with HNO$_3$ and then centrifuged for 10 minutes to provide a stable colloidal seed suspension. The suspended solids had a median size of about 0.2 microns. Suspended solids content of the centrifuged seed slurry was 7.0 wt.%. The gelling agent for Type A material was MgO and 0.5 wt.% was used (Al$_2$O$_3$ basis) being added as a 15% Mg(NO$_3$)$_2$ solution. With Type B material, 1% Al$_2$O$_3$ was added as a 21% Al(NO$_3$)$_3$ solution.

The seed slurry described above was usually added to the boehmite slurries before the pH was adjusted to 2.0. The quantity of seed used is expressed as percent of total alumina (Al$_2$O$_3$ equivalent) in the system.

The gels were oven dried overnight at 90° C. then heated one hour at 600° C. to remove the nitrates. On drying, the gels shrank significantly and broke up into hard fragments.

Chunks of material (after drying at 90° C.) were analyzed using a dilatometer at a heating rate of 2K./min. to determine sintering characteristics. The fired densities of the dilatometer specimens were then determined and densities through the heating range were calculated from the shrinkage data.

Figure 6:
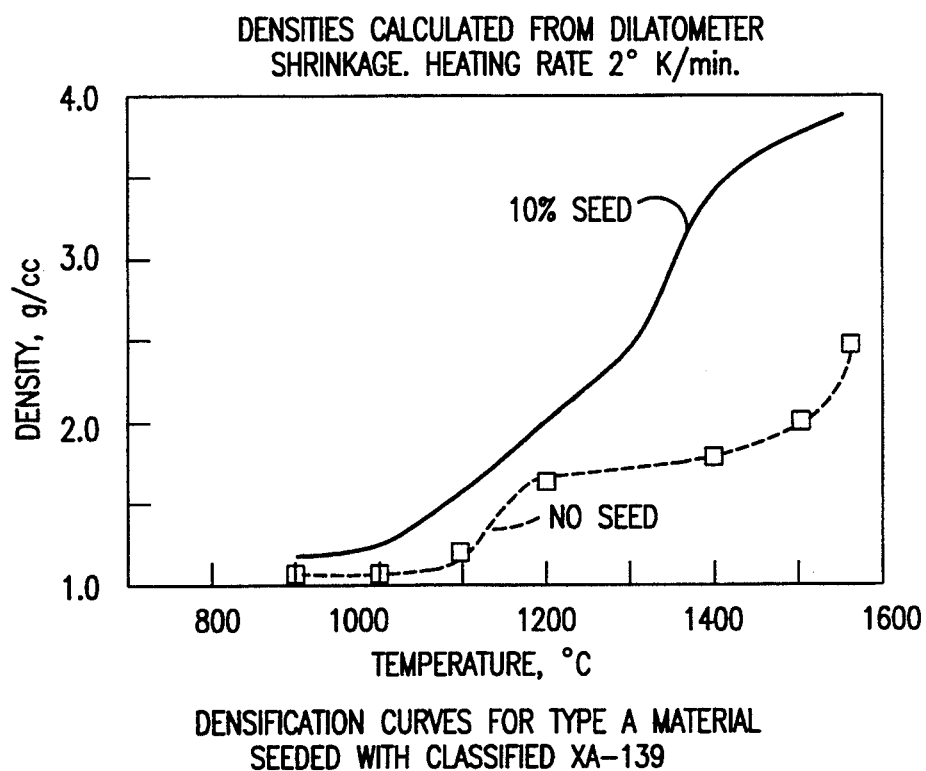
FIG. 6 is a graph showing the sintering characteristics of Type A material.

Type A material was tested at 0 and 10% seeding. FIG. 6 shows the sintering characteristics of the two materials. During the dilatometer test, the seeded sample achieved nearly full densification while the unseeded sample was only beginning to densify. The seeded sample shows the first rapid density change in the 1000°–1100° C. range which is believed to correspond to alpha-alumina formation. The unseeded sample shows this same density increase at about 100° higher temperature.

In order to test the effect of soda, Type B material was further studied with about 0.25% Na$_2$O and virtually Na$_2$O-free. For each soda level, seed was used at levels of 0, 1 and 10%. FIGS. 7A-C and 8A-C show SEM's of sintered granules of this material.

Figure 9:
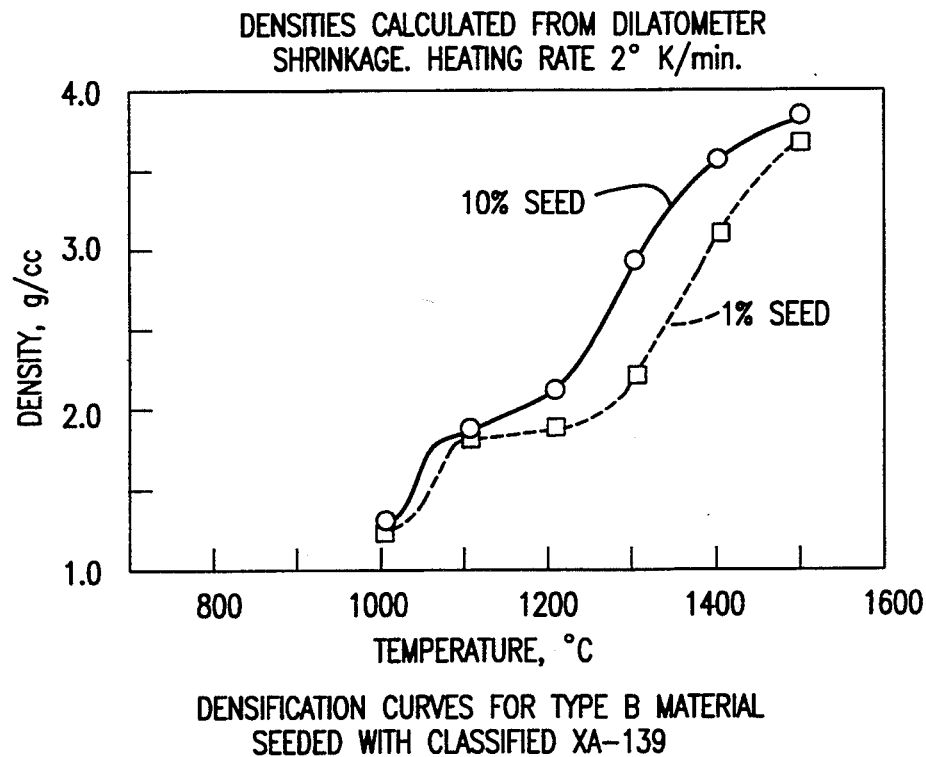
FIG. 9 is a graph showing sintering curves for Type B material with and without Na$_2$O.
Figure 7A:
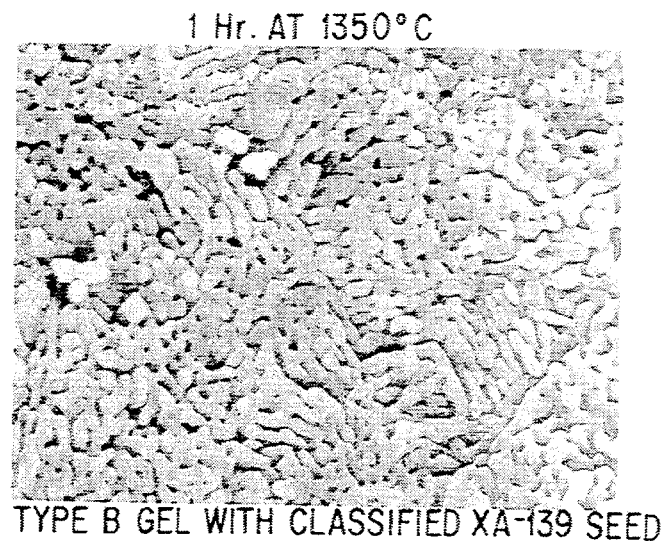
FIGS. 7A–C are photomicrographs showing SEM's of sintered granules of Type B material.
Figure 7B:
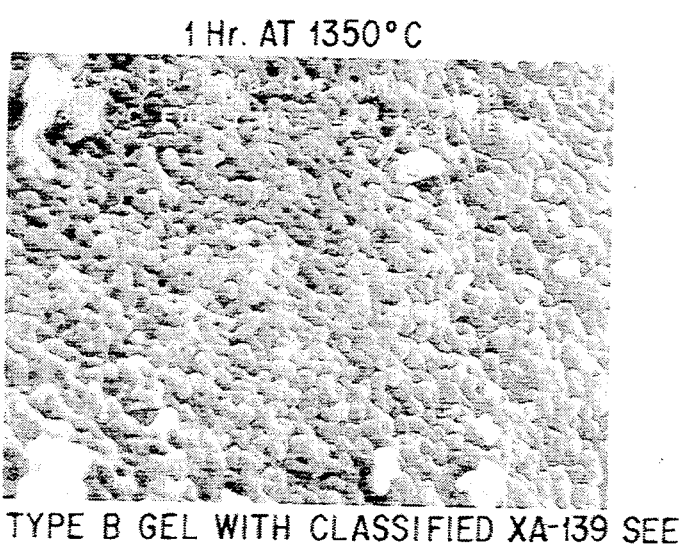
Figure 7C:
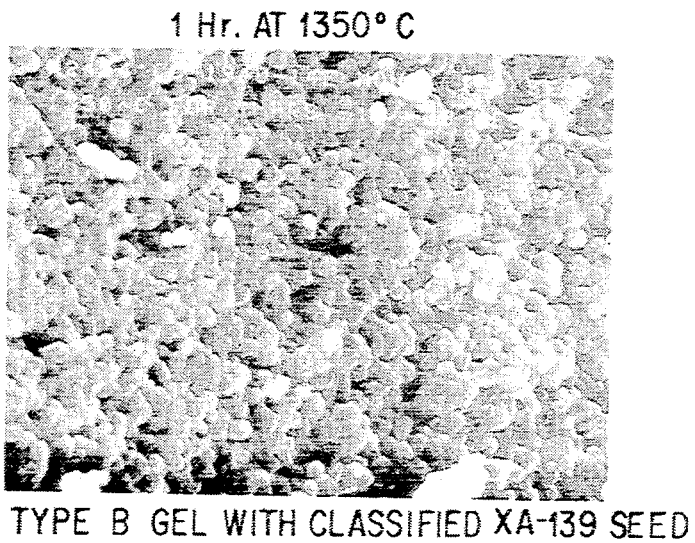
Figure 8A:
FIGS. 8A–C are photomicrographs showing SEM's of sintered granules of Type B material.
Figure 8B:
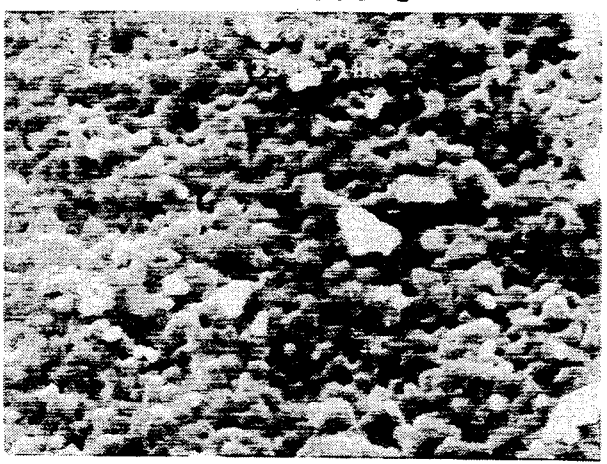
Figure 8C:
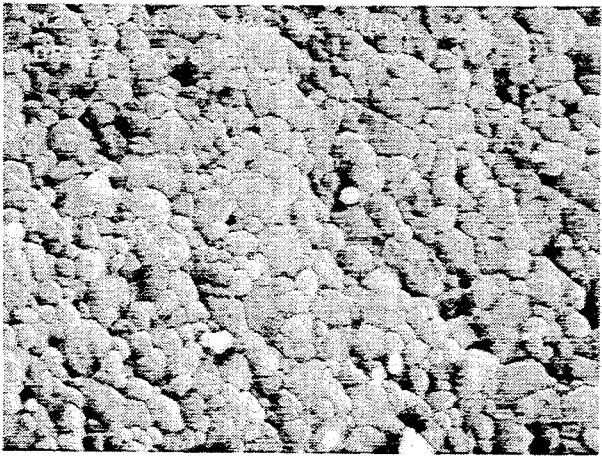
Figure 10:
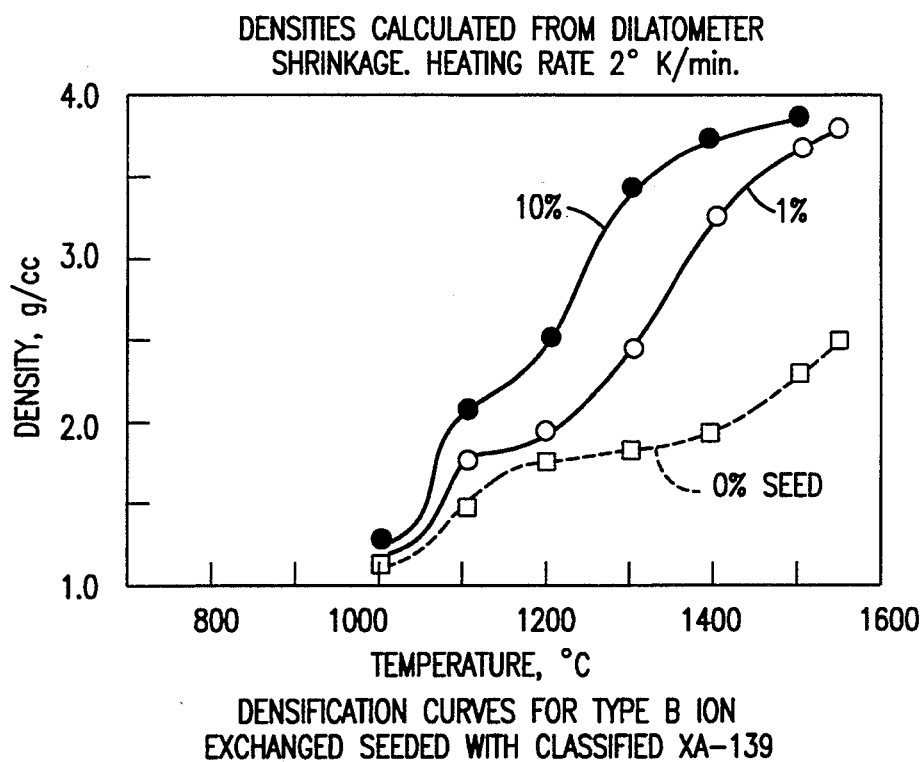
FIG. 10 is a graph showing sintering curves for Type B material with and without Na$_2$O.
Figure 11:
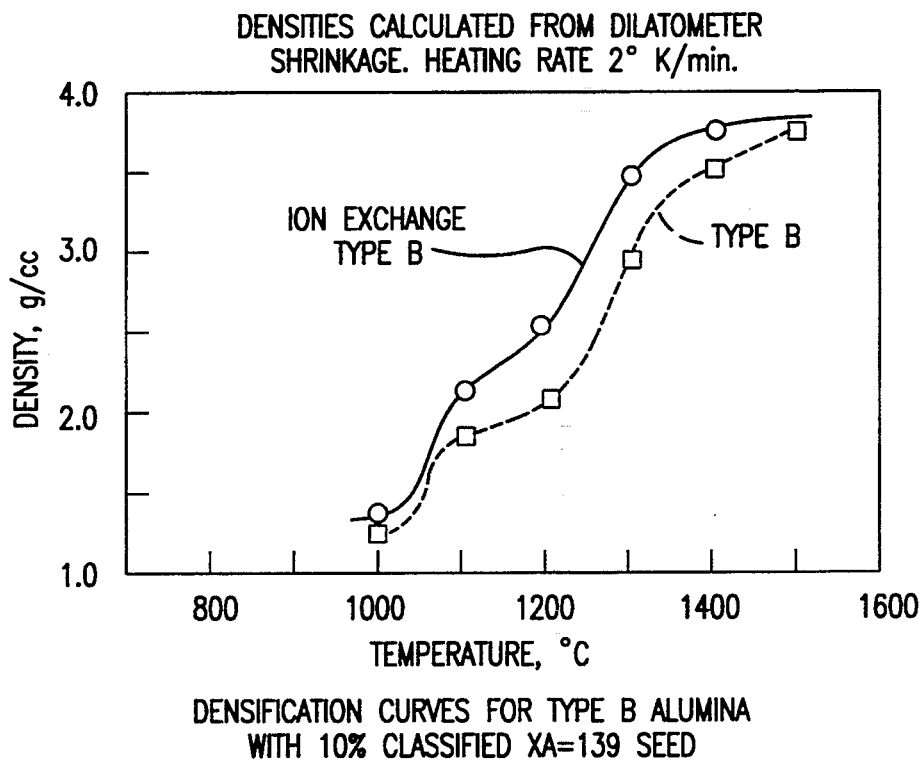
FIG. 11 is a graph comparing sintering data for materials made in accordance with the invention.

These sintered specimens show the trend of less porosity with increasing seed loading. The low soda 10% seed specimen appears to be fully dense while the corresponding high soda material has some porosity. Both exhibit a very fine-grained microstructure. FIGS. 9 and 10 show sintering curves for Type B material with and without Na$_2$O (before and after ion exchange) and FIG. 11 compares sintering data for these two materials and Type B with 10% seed added. The low-soda sample densifies at a significantly lower temperature than the high soda version.

TABLE 2

ANALYSES OF DISPERSIBLE BOEHMITES
Analyses of Sol-Gel Aluminas

| | Type A P-2781 | Type B As-is CC-1963-16 | Type B Ion Xch'd CC-1940-1 |
|---|---|---|---|
| SiO$_2$ | .008 | .018 | .015 |
| Fe$_2$O$_3$ | .022 | .021 | .020 |
| TiO$_2$ | .036 | .04 | .04 |
| Na$_2$O | .19 | .23 | .009 |
| CaO | .016 | .017 | .000 |
| MgO | .001 | .001 | .001 |
| ZnO | .003 | .004 | .004 |
| CuO | .000 | .000 | .000 |
| Ga$_2$O$_3$ | .001 | .010 | .006 |
| V$_2$O$_3$ | .000 | .000 | .000 |
| NiO | .000 | .000 | .000 |
| MnO | .000 | .000 | .000 |
| Cr$_2$O$_3$ | .001 | .000 | .000 |
| B$_2$O$_3$ | .000 | .000 | .000 |
| ZrO$_2$ | .000 | .000 | .000 |
| LiO$_2$ | .000 | .000 | .000 |

TABLE 2-continued
ANALYSES OF DISPERSIBLE BOEHMITES
Analyses of Sol-Gel Aluminas

| | Type A<br>P-2781 | Type B | |
|---|---|---|---|
| | | As-is<br>CC-1963-16 | Ion Xch'd<br>CC-1940-1 |
| S.A.* (m²/g) | 100–110 | 120–125 | 125 |
| Moist. (%) | | | |
| LOI (%) | 17.61 | 17.2 | |
| Gibbsite (%) | — | | |
| Bayerite (%) | — | | |
| Boehmite (%) | 97 | | |
| Xtal Size (A) | 105 | | |

*Dried at 110° C.

It will be understood that the above description of the present invention is susceptible to various modifications, changes and adaptations and the same are intended to be comprehended within the meaning and range of equivalents of the appended claims.

What is claimed is:

1. A method of making a microcrystalline boehmite product comprising heating under autogenous pressure a mixture including boehmite alumina precursor in an aqueous medium having an acidic or basic pH, in the presence of seed effective for boehmite growth, and adding before said heating submicron seed effective to promote alpha alumina growth upon sintering to provide a colloidal seed suspension, wherein said seed effective for boehmite growth is present in an amount of at least 5% by weight of the precursor alumina, each calculated as $Al_2O_3$, and said heating is carried out at a high temperature for a time sufficient to convert said boehmite alumina precursor to microcrystalline boehmite whereby a colloidal microcrystalline boehmite product is obtained.

2. A method as recited in claim 1, wherein said pH is about 5 or less.

3. A method as recited in claim 2, further comprising the step of adding a gelling agent to said colloidal microcrystalline boehmite product.

4. A method as recited in claim 3, wherein said gelling agent is magnesium oxide.

5. A method as recited in claim 1, further including the step of removing alkali metal ions from the colloidal microcrystalline boehmite product.

6. A method as recited in claim 5, wherein said alkali metal ions are sodium ions.

7. A method as recited in claim 5, wherein said step of removing alkali metal ions includes contacting said colloidal microcrystalline boehmite product with an ion exchange medium.

8. A method of producing high purity microcrystalline boehmite, comprising the steps of
   (a) providing an aqueous medium containing an aluminum oxide precursor of boehmite, and at least 5% by weight, based on alumina precursor solids each calculated as $Al_2O_3$ of boehmite seed material having a particle size finer than about 0.05 microns,
   (b) adding submicron seed effective to promote alpha alumina growth upon sintering to said medium before the conversion of the precursor to boehmite,
   (c) heating in an autoclave said medium under at least autogenous pressure to convert said precursor to boehmite, and
   (d) removing metal cations from the boehmite with an ion exchange medium.

9. A method as recited in claim 1, wherein said seed effective for boehmite growth includes colloidal boehmite seed.

10. A method as recited in claim 1, wherein said seed effective for boehmite growth includes colloidal seed having a crystal structure approximating that of boehmite.

11. A method as recited in claim 1, wherein said seed effective to promote alpha alumina growth upon sintering is alpha alumina.

12. A method as recited in claim 8, wherein said submicron seed effective to promote alpha alumina growth upon sintering is alpha alumina.

* * * * *